United States Patent
Brusseau et al.

(10) Patent No.: US 6,787,038 B2
(45) Date of Patent: Sep. 7, 2004

(54) EXTRACTION OF POLLUTANTS FROM UNDERGROUND WATER

(75) Inventors: Mark Brusseau, Tucson, AZ (US); Thomas Boving, Hope Valley, RI (US); William Blanford, San Antonio, TX (US); Eric Klingel, Mooresville, NC (US); John McCray, Golden, CO (US); Xiaojiang Wang, Tucson, AZ (US)

(73) Assignee: Cerestar Holding B.V. (NL)

( * ) Notice: Subject to any disclaimer, the term of this patent is extended or adjusted under 35 U.S.C. 154(b) by 0 days.

(21) Appl. No.: 10/067,273

(22) Filed: Feb. 5, 2002

(65) Prior Publication Data
US 2003/0146172 A1 Aug. 7, 2003

(51) Int. Cl.$^7$ .................................................. C02F 1/26
(52) U.S. Cl. .................... 210/634; 210/747; 210/805; 166/279; 166/306; 405/128.45; 405/128.75
(58) Field of Search .................. 210/634, 747, 210/170, 767, 805; 166/279, 306; 405/128.45, 128.5, 128.7, 128.75, 129.2, 129.25

(56) References Cited

U.S. PATENT DOCUMENTS

| | | | | |
|---|---|---|---|---|
| 4,255,249 A | * | 3/1981 | Shibanai et al. | |
| 4,362,213 A | * | 12/1982 | Tabor | 166/306 |
| 4,997,373 A | * | 3/1991 | Tanaka et al. | 405/128.45 |
| 5,173,092 A | * | 12/1992 | Rudder | 210/747 |
| 5,190,663 A | | 3/1993 | Fetzer | |
| 5,348,420 A | * | 9/1994 | Bernhardt | 166/306 |
| 5,425,881 A | | 6/1995 | Szejtli et al. | |
| 5,725,470 A | * | 3/1998 | Lazarowitz et al. | 210/747 |
| 6,352,387 B1 | * | 3/2002 | Briggs et al. | 210/747 |
| 6,459,011 B1 | * | 10/2002 | Tarr et al. | 405/128.75 |
| 6,599,747 B1 | * | 7/2003 | Reid et al. | 436/25 |
| 2001/0008222 A1 | * | 7/2001 | Ma et al. | 210/767 |

OTHER PUBLICATIONS

W.J.Blanford, M.L.Barackman, T.B.Boving, E.J.Klingel, G.R.Johnson and M.L.Brusseau (Feb. 20, 2001). Cyclodextrin–Enhanced Vertical Flushing of a Trichloroethene Contaminated Aquifer. Ground Water Monitoring and Remediation 21: 58–66.

* cited by examiner

Primary Examiner—Christopher Upton
(74) Attorney, Agent, or Firm—Muserlian, Lucas and Mercanti

(57) ABSTRACT

Pollutants are extracted from sub-surface water using an aqueous solution of cyclodextrin and a vertical circulating well. Complexes of the pollutant and cyclodextrin are recovered from the bottom of the well. When the pollutant is volatile, the complexes are separated into pollutant and cyclodextrin by air stripping.

14 Claims, 1 Drawing Sheet

EXTRACTION OF POLLUTANTS FROM UNDERGROUND WATER

BACKGROUND OF THE INVENTION

1. Field of the Invention

This invention relates to a method for extraction of pollutants from underground water using vertical circulating wells and cyclodextrins.

2. Art Relating to the Invention

Underground water is present in a number of sub-surface formations such as aquifers, sediment, and vadose zones. Oftentimes, these sub-surface formations are polluted with organic compounds, inorganic compounds, and combinations thereof. These pollutants are generally toxic to humans and animals, and the pollution of sub-surface water is a major environmental problem.

One standard method for extracting pollutants from sub-surface water is to use vertical circulating wells. Such wells are drilled into the polluted sub-surface and water is pumped into the strata in a vertical flow, perpendicular to the strata, at one level and removed at a lower level. The removed water is then treated to remove the pollutant and pumped back into the well. This flushing technique is continued until the concentration of pollutants in the water reaches an acceptable level.

Cyclodextrins are a non-toxic, biodegradable material which has been used in the past to extract organic compounds from soil. For example, see U.S. Pat. No. 4,255,249 which relates to the extraction of oil from oil sand; and U.S. Pat. No. 5,425,881 which relates to the extraction of hydrocarbon pollutants from contaminated soil. Both the '249 and '881 patents require mixing cyclodextrin or an aqueous solution of cyclodextrin with the soil and then extracting the complex of cyclodextrin and hydrocarbon from the soil.

Cyclodextrins are made from starch through the use of an enzyme, cyclodextrin glycosyltransferase (CGT). Typically, the starch is first gelatinized and then liquefied to a DE of 1 to 5 with either an acid or enzyme. The CGT enzyme forms alpha-, beta- and gamma-cyclodextrins, both branched and unbranched.

One of the unique features of cyclodextrins is their ability to form complexes with other compounds. The cyclodextrin has a torus structure where the interior is hydrophobic and the exterior is hydrophilic. Oftentimes, the exterior is modified to increase the hydrophilic nature of the cyclodextrin.

The use of other compounds such as cosolvents and surfactants have been suggested for use in vertical circulating wells. The disadvantage to cosolvents and surfactants is that they themselves are oftentimes pollutants which must be removed from the sub-surface water.

There is a need for a better extraction process of pollutants from ground water.

SUMMARY OF THE INVENTION

Applicants have now discovered that a wide range of pollutants can be removed from sub-surface water by using cyclodextrins in the water pumped into a vertical circulating well. The cyclodextrin is allowed to travel with the water as it sweeps from its inlet point to its outlet or recovery point in the sub-surface formation without the need for agitation. This is especially novel because cyclodextrins are generally not used to complex with another compound without mixing or agitation.

Applicants have also learned that the complex of cyclodextrin with the pollutant can be broken by an air stripping process. Specifically, a countercurrent flow between a downward flow of water containing the complex and upward moving air causes the pollutant to separate from the cyclodextrin. This is especially novel because conventionally these complexes are separated into their component parts by heat, e.g. boiling an aqueous solution of the complexes and then separating the cyclodextrin from the other components.

Broadly, the process of the present invention entails the extraction of pollutants from sub-surface water comprising:
a) introducing an aqueous cyclodextrin solution into a sub-surface area containing water with pollutants;
b) allowing said aqueous cyclodextrin solution to flow downward through said sub-surface area to form complexes with said pollutants; and
c) recovering water with said complexes from an area below where said aqueous cyclodextrin solution was introduced into said sub-surface area.

Preferably, the process of the present invention further includes separating said cyclodextrin from said pollutants and recycling said cyclodextrins to use the cyclodextrins again in step (a). More preferably, this separation is conducted by air stripping the pollutant from the cyclodextrin.

Preferably, a vertical circulation well is employed wherein the aqueous solution of cyclodextrin is introduced with a diffuser ring partway down the well and the water with the complexes is recovered at the bottom of the well. As will be appreciated, such a system employs a single well to both introduce and recover the water through a vertical flow pattern that sweeps the treated sub-surface area.

Liquid pumps are suitably used to move the fluids throughout the process. Gravity causes the aqueous cyclodextrin solution to move downward, perpendicular to the strata, in a vertical flow pattern. The contact between the downward flowing cyclodextrin and the pollutant in the water causes the complexation to take place.

The use of cyclodextrins to extract pollutants from sub-surface water has a number of advantages. It has been found that the cyclodextrins have an insignificant reactivity with porous underground formations; that the cyclodextrins are insensitive to pH, ionic strength, presence of salt and other sub-surface environmental factors; that the cyclodextrins have a low potential to mobilizing pollutants away from the recovery area; that cyclodextrins are reusable, thus, keeping cost down; and that cyclodecxtrins are non-toxic and biodegradable such that recovery of the cyclodextrins from the sub-surface area is not necessary.

BRIEF DESCRIPTION OF THE DRAWINGS

These and other aspects of the present invention may be more fully understood by reference to one or more of the following drawings wherein.

DETAILED DESCRIPTION OF THE INVENTION

Figure 1:
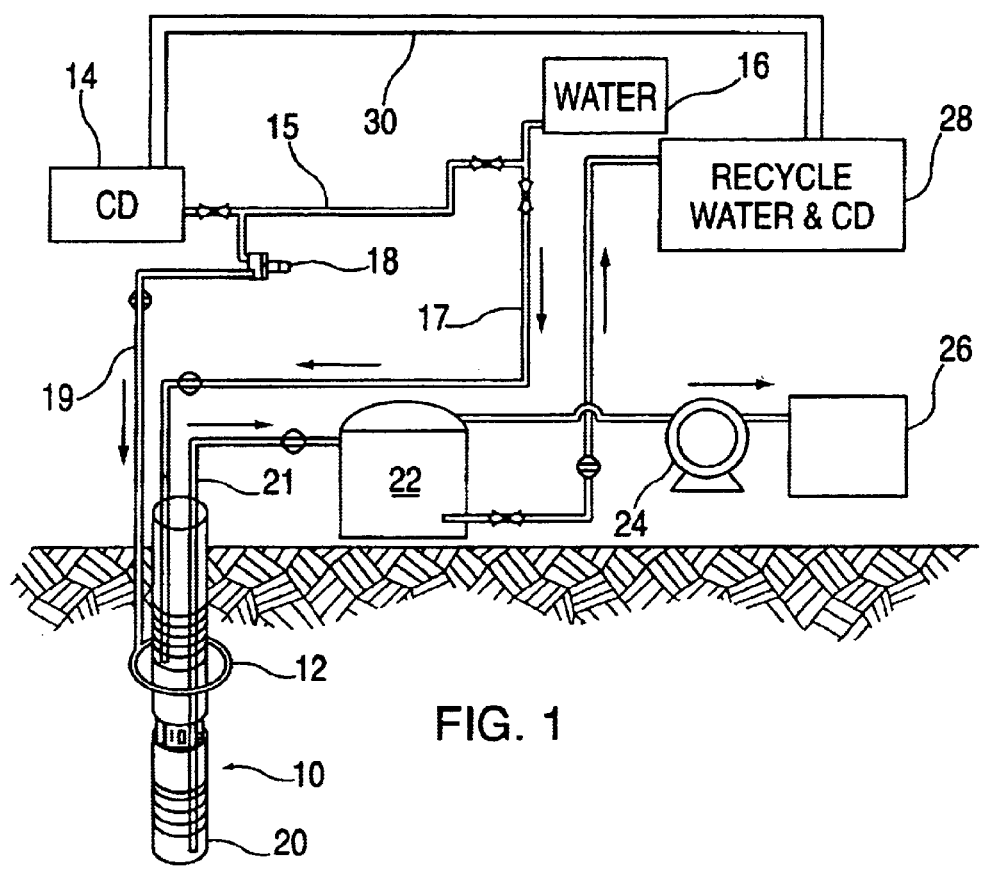
FIG. 1 illustrates a schematic of equipment used to perform the process of the present invention.

As shown in FIG. 1, vertical circulating well 10 has a diffuser ring 12 through which an aqueous cyclodextrin solution from tank 14 is delivered to diffuser ring 12. Portable water tank 16 is used to dilute or assist in the flow of cyclodextrin solution to diffuser ring 12 by cyclodextrin inlet pipe 15 ot to add water to well 10 by water inlet pipe 17. Pump 18 is used to pump the cyclodextrin solution into well 10 by pipe 19.

Pipe 17 is used to add water to the treated area to help sweep the cyclodextrin solution through the treated area. As is conventional, diffuser ring 12 causes a broad sweep of fluid through the treated sub-surface area.

Sub-surface pump 20 removes the aqueous solution of complexed cyclodextrin and pollutant from well 10 through outlet pipe 21 and pumps it to the top of air stripper 22. Volatile pollutants are removed from the top of stripper 22 and blown by blower 24 into carbon treatment device 26. Water with cyclodextrin is pumped to recycle tank 28. This used water and cyclodextrin can be recycled by recycle pipe 30 back to tank 14 for reuse in the process. The arrows shown along the pipes illustrate the flow of fluid in the pipes.

The arrangement shown in FIG. 1 is that of a conventional vertical circulating well except for the use of tank 14 to add cyclodextrin and to vertically sweep cyclodextrin through the treated sub-surface area.

As is apparent, this is an in situ treatment process wherein pollutants are removed from the sub-surface ground water without having to remove the water or the sub-surface formation from the ground.

Suitably, the cyclodextrins used in the present invention include alpha-cyclodextrin, beta-cyclodextrin, gamma-cyclodextrin, mixtures thereof, derivatives of these cyclodextrins such as alkyl, hydroxyalkyl, acyl derivatives, e.g. methyl, ethyl, hydroxyethyl, hydroxypropyl, and mixtures thereof. Additionally, water soluble polymers of cyclodextrins can be used. Preferably, the cyclodextrin is modified to increase its water solubility. Good results have been obtained with hydroxypropylated beta-cyclodextrin.

Suitably, the concentration of cyclodextrins in the aqueous solution which is introduced into the well is suitably about 1% to about 30% by weight solution and, more preferably, about 5% to about 20% by weight. This is the concentration of the aqueous solution at the diffuser ring.

Pollutants that can be recovered with the present invention include chlorinated-solvent pollutants, petroleum-based pollutants such as gasoline, diesel fuel and aviation fuel, coal tar pollutants, creosote pollutants, polychlorinated biphenyl pollutants, pesticide pollutants, explosive/munitions waste, heavy metals and radionuclides.

Examples of organic pollutants which can be extracted from sub-surface water in accordance with the present invention include hydrocarbons to include aromatic hydrocarbons and their derivatives. Good results have been obtained with volatile organic pollutants such as trichloroethene.

Examples of inorganic pollutants which can be extracted from sub-surface water in accordance with the present invention include lead, mercury and strontium.

The formation of the complex between the cyclodextrin and pollutant comprises not only traditional guest-host interaction wherein the pollutant, in part, resides in the interior of the cyclodextrin, but also where there is loose association between the pollutant and the cyclodextrin thereby causing the two to travel together and be recovered together.

The vertical circulation well such as the one illustrated in FIG. 1 is conventional. Its construction and operation are done in a conventional manner using conventional equipment.

The fluid flow rates through the vertical well are suitably adjusted for the size of the well and the equipment employed.

Air stripper 22 is a conventional air stripper operated in a conventional manner. It is truly surprising and unexpected that cyclodextrin complexes can be broken by air stripping.

Alternatively, any other conventional separation technique can be used to separate the cyclodextrin from the pollutant, for example, heating or boiling.

Good results have been found for removal of volatile pollutants from the recovered water by air stripping or sparging. Non-volatile components can be removed by treatment with heat to break the complex and then activated carbon or charcoal. Ion exchange resin can also be used. Nano-filtration or ultrafiltration can be used to recover the cyclodextrin.

EXAMPLE 1

This example illustrates the increased recovery of a pollutant using a cyclodextrin flush compared to a water flush.

A vertical circulating well like the one in FIG. 1 was made by drilling a bore hole to a depth of 56.4 m. A 15.2 cm blank steel casing and stainless steel well screen were installed to a depth of 55.15 m. The well was screened at two intervals. Each screen was made of stainless steel with 1 mm wide slots, each 3.17 m long. The bottoms of the upper and lower screens were 48.6 m and 55.0 m below the surface. Packing was employed between the two screens. A diffuser ring was employed at the upper screen. An aqueous solution of hydroxypropylated beta-cyclodextrin was pumped into the well through the diffuser and additional water was pumped in to assist the cyclodextrin sweep through the treated area. The concentration of cyclodextrin in the water pumped to the diffuser was about 20% by weight. The sub-surface area was known to be polluted with trichloroethene (TCE) at a concentration of 2 $\mu$g TCE per ml of ground water and 1 $\mu$g TCE per gram of sediment.

It was found that pumping water without cyclodextrin that the concentration of TCE in the recovered water was about 300 $\mu$g/L. When the 20% aqueous hydroxypropylated beta-cyclodextrin solution was employed, the concentration of TCE increased to about 800 $\mu$g/L in the recovered water. Such a high concentration of TCE continued throughout an 8½ hour flush with the cyclodextrin solution. After the cyclodextrin flush, a water flush without cyclodextrin was again employed to flush the sub-surface area and the recovery of TCE returned to about 300 $\mu$/L of recovered water.

The amount of cyclodextrin solution injected into the well through the diffuser ring was 7.6 L/min. while water was pumped into the upper screen at 7.6 L/min. The complex-water solution was removed from the lower screen at a rate of 15.2 L/min. It was found that 54% of the injected cyclodextrin mass was recovered.

From the example, it can be seen that increased efficiency was obtained with a cyclodectrin flush. The cyclodextrin flush increased recovery of the pollutant by about 260%.

EXAMPLE 2

This example illustrates the use of an air stripper to separate a pollutant from a complex of cyclodextrin and pollutant.

An aqueous 10% hydroxypropylated beta-cyclodextrin was prepared and then mixed with water containing TCE in an amount of 5000 $\mu$g/L to form an aqueous solution with with the complex of cyclodextrin and TCE.

This solution with complex was subject to air stripping wherein the water was fed to the top of a series of trays in the air strippiing unit and air was injected into the bottom of the trays such that it passed upward through the water in the trays so as to create a countercurrent flow between the water and the air.

TCE recovery was around 98% of the complex solution.

To compare the recovery to conventional water solution with TCE, a water-TCE solution was subject to air stripping and it was found that the recovery of TCE from the water was about 99.98%. The TCE concentration in the water had been 5000 µg/L.

In both cases, complex-water solution and TCE-water solution, the air stripper was run at 30 L/min. influent solution and an air flow rate of 13,000 standard ft/min.

This example illustrates that the recovery of a pollutant from a complex of cyclodextrin and pollutant is virtually identical to conventional air stripping of the pollutant from water.

It will be understood that the claims are intended to cover all changes and modifications of the preferred embodiments of the invention herein chosen for the purpose of illustration which do not constitute a departure from the spirit and scope of the invention.

What is claimed is:

1. A process for extraction of pollutants from sub-surface water comprising:
   (a) introducing an aqueous cyclodextrin solution into a sub-surface area containing water with pollutants;
   (b) allowing said aqueous cyclodextrin solution to flow downward through said sub-surface area to form complexes with said pollutants; and
   (c) recovering water with said complexes from below where said aqueous solution was introduced into said sub-surface area.

2. The process of claim 1 further comprising:
   (d) separating said complex into cyclodextrin and pollutant; and
   (e) recycling said cyclodextrin to reintroduce said cyclodextrin into said sub-surface area.

3. The method of claim 2 wherein said separating is conducted by air stripping said pollutant from said cyclodextrin.

4. The process of claim 1 wherein said cyclodextrin is selected from the group consisting of alpha-cyclodextrin, beta-cyclodextrin, gamma-cyclodextrin, derivatives of cyclodextrins, and mixtures thereof.

5. The process of claim 1 wherein said aqueous cyclodextrin solution has a concentration of about 1% to about 30% by weight solution of cyclodextrin.

6. The process of claim 1 wherein the pollutant is selected from the group of organic and inorganic pollutants.

7. The process of claim 1 wherein a vertical circulating well is used to introduce said aqueous cyclodextrin solution and recover said water and complex.

8. The process of claim 1 wherein said pollutant is trichloroethane and said cyclodextrin is hydroxypropylated beta-cyclodextrin.

9. The process of claim 1 wherein the polluteant is organic pollutants.

10. In a process for extracting pollutants from sub-surface water comprising:
    using a vertical circulating well having a diffuser ring for introducing water in said well and a sub-surface pump for removing water said well, said sub-surface pump positioned below and diffuser ring in said well;
    adding cyclodectrin to water introduced into said well through said diffuser ring; and
    recovering complexes of cyclodextrin and pollutants from said well with said sub-surface pump.

11. The process of claim 10 wherein said cyclodextrin in said water introduced into said well is present in a concentration of about 1% to about 30% by weight of mixture of water and cyclodextrin.

12. The process of claim 10 further comprising separating said recovered complex into cyclodextrin and pollutant, and recycling said cyclodextrin.

13. The process of claim 10 wherein said cyclodextrin is selected from the group consisting of alpha-cyclodextrin, beta-cyclodextrin, gamma-cyclodextrin, derivatives of cyclodextrin, and mixtures thereof.

14. A process for extraction of trichloroethene from an aquifer comprising:
    (a) forming a vertical circulating well in a sub-surface area polluted with trichloroethene;
    (b) introducing an aqueous hydroxypropylated beta-cyclodextrin solution into said sub-surface area with a diffuser ring of said well;
    (c) allowing said solution to flow downward through said sub-surface area to form complexes between said cyclodectrin and said trichloroethene;
    (d) recovering water at the bottom of said well with said complexes therein;
    (e) separating said complex by air stripping into cyclodextrin and trichloroethene; and
    (f) recycling cyclodextrin after separation from the complex back to step (b).

* * * * *